United States Patent [19]

Wallace

[11] Patent Number: 5,269,133
[45] Date of Patent: Dec. 14, 1993

[54] HEAT EXCHANGER FOR COOLING A GAS TURBINE

[75] Inventor: Thomas T. Wallace, Maineville, Ohio

[73] Assignee: General Electric Company, Cincinnati, Ohio

[21] Appl. No.: 979,362

[22] Filed: Nov. 20, 1992

Related U.S. Application Data

[63] Continuation of Ser. No. 716,866, Jun. 18, 1991, abandoned.

[51] Int. Cl.⁵ .............................................. F02K 3/02
[52] U.S. Cl. .................................... 60/204; 60/226.1; 60/39.83; 165/142
[58] Field of Search ................. 60/226.1, 39.83, 39,02, 60/39.08; 165/142

[56] References Cited

U.S. PATENT DOCUMENTS

| | | | |
|---|---|---|---|
| 2,479,573 | 8/1949 | Howard. | |
| 2,672,013 | 3/1954 | Lundquist. | |
| 2,937,855 | 5/1960 | Hazen | 165/142 |
| 3,116,789 | 1/1964 | Kent | 165/142 |
| 3,201,936 | 8/1965 | Zirin | 165/142 |
| 3,475,906 | 11/1969 | Madelung. | |
| 4,187,675 | 2/1980 | Wakeman. | |
| 4,254,618 | 3/1981 | Elovic. | |
| 4,271,666 | 6/1981 | Harley et al.. | |
| 4,351,150 | 9/1982 | Schulze | 60/226.1 |
| 4,479,535 | 10/1984 | Echigo et al. | 165/142 |
| 4,542,623 | 9/1985 | Hovan et al.. | |
| 4,548,257 | 10/1985 | Williamson | 165/142 |
| 4,561,246 | 12/1985 | Hovan | 60/226.1 |
| 4,782,658 | 11/1988 | Perry | 60/226.1 |

FOREIGN PATENT DOCUMENTS

1244340 8/1971 United Kingdom ............... 60/226.1

OTHER PUBLICATIONS

Luu et al. "Thermal and Fluid Design of a Ceramic Bayonet Tube Heat Exchanger for High-Temperature Waste Heat & Recovery".
In: Hayes, A. J., "Industrial Heat Exchangers", (American Society for Metals, 1985) pp. 159, 160.

Primary Examiner—Richard A. Bertsch
Assistant Examiner—Michael I. Kocharov
Attorney, Agent, or Firm—Jerome C. Squillaro; John R. Rafter

[57] ABSTRACT

A heat exchanger for cooling turbine components of a gas turbofan engine in which air to be cooled is directed along a first annular, radially extending path away from the engine and cooled by bypass air. The cooled air is returned to the engine along a second radially-extending path concentric to the first path. In a preferred embodiment, the heat exchanger is a standpipe extending from the compressor outlet to the bypass air duct and includes inner and outer tubular members oriented concentrically to form inner and outer counterflowing air flow paths which also are concentrically arranged. The outer member is mounted on the combustor casing and the inner member on a diffuser within the casing. Accordingly, no mechanical connection exists between the inner and outer members.

11 Claims, 2 Drawing Sheets

HEAT EXCHANGER FOR COOLING A GAS TURBINE

This application is a continuation of application Ser. No. 07/716,86, filed Jun. 18, 1991, now abandoned.

BACKGROUND OF THE INVENTION

The invention relates to the cooling of components of a gas turbine engine; and in particular, heat exchangers utilizing bypass air to cool such components.

In a gas turbine engine such as those typically used to power aircraft, a compressor discharges high pressure compressed air into a combustion chamber where it is mixed with fuel and the mixture burned. The resulting combustion gases drive a turbine which provides engine power and thrust. In order to increase the efficiency and power of the turbine, it is desirable that the combustion gases have the highest possible temperature. On the other hand, it is desirable that the turbine components driven by the exhaust gases be maintained at a lower temperature than the combustion gases to prevent degradation of the components.

Gas turbine engines have been provided with mechanisms for cooling the turbine components, thereby protecting the components from the extreme heat of the exhaust gases. Techniques for providing cooling air through and around turbine blades are well known. For example, U.S. Pat. No. 2,479,573 issued to A. Howard illustrates a cooling mechanism which provides a film of cool air over the turbine blades.

Bypass air supplied by a fan at the air inlet end of the engine is substantially cooler than the air being worked within the engine. It is known to use bypass air to cool compressed air in an air-to-air heat exchanger located in the bypass air duct. The heat exchanger receives compressed air from the core, and cooled air is returned to the core as secondary cooling air and routed to turbine components for more effective cooling.

Typically, a standard serpentine flow heat exchanger is used in the bypass duct for cooling secondary air, but such a device has several disadvantages in this environment. For example, such heat exchangers typically are relatively bulky and tend to negate any other weight reduction attempts within the engine. Since such heat exchangers are manifested by one or more large box-like mechanisms equally spaced around the circumference of the bypass air duct, they disrupt the uniform flow of bypass air through the bypass duct which may lead to downstream hot spots. Further, the serpentine air path of such heat exchangers presents a substantial resistance to the cooling air flow and results in a significant pressure drop as the air travels through the heat exchanger.

Such systems also require manifolds for drawing and returning the air to prevent localized pressure effects from inhibiting combustor or turbine performance. In order to absorb localized thermal-growth differences between one end of the heat exchanger located at the high temperature turbine inlet and the other end of the heat exchanger located at the cooler compressor discharge, special seal mechanisms are required which allow relative motion while simultaneously being subjected to high pressure. Accordingly, there is a need for a heat exchanger for use with a turbofan engine which minimizes any disruption of bypass air flow and does not require expensive seals to compensate for dimensional variations brought about by thermal gradients.

SUMMARY OF THE INVENTION

The present invention is a heat exchanger for a turbofan engine which uses bypass air for providing improved cooling of engine components but lacks the disadvantages of prior art heat exchangers.

The present invention is used with a gas turbine engine having an inlet fan, a compressor stage, a combustor stage and a turbine stage. The heat exchanger is located at the inlet of the combustor stage and comprises one or more standpipe units extending radially from the engine and having a heat transfer member cooled externally by bypass air supplied by the fan. Each standpipe unit includes inner and outer coaxial tubular members arranged to provide an air flow channel created by an annular space between the two members. One end of the air flow channel has an inlet open to the compressor discharge. Air flowing through the channel from the compressor loses heat through the outer member to the bypass air. At the end of that channel, the air flow is reversed and passes down through the center of the inner tubular member to a manifold directing the air to the turbine stage to cool turbine components.

An advantage of such a design is that the inner and outer heat exchanger components are not connected and therefore may independently expand and contract at different rates and magnitudes, thereby eliminating the need for expansion joints and seals. Further, the air flow experiences only a single directional change in its passage through parallel paths in the heat exchanger, thereby minimizing pressure drop across the heat exchanger.

In a preferred embodiment, the cross-section of the heat exchanger is either circular, elliptical or an aerodynamic foil shape to minimize the disturbance to the bypass air flow and to optimize surface area available for heat transfer relative to the stress and weight of the unit. Accordingly, hot spots downstream of the heat exchanger are minimized or avoided.

Also in the preferred embodiment, the heat exchanger is located at the junction of the output of the compressor stage and the input of the combustor stage where the temperature of the air is cooler than at the turbine inlet. Consequently, the coolest possible air is discharged from the heat exchanger.

Accordingly, it is an object of the present invention to provide a heat exchanger for a turbofan engine that efficiently and reliably cools turbine components; a heat exchanger which minimizes the resistance to air flow and the pressure drop across the heat exchanger in the bypass air duct; a heat exchanger which eliminates seals between parts to absorb differing dimensional changes; and a heat exchanger which minimizes the disturbance to the flow of the bypass air to minimize downstream hot spots.

Further objects and advantages of the present invention shall become apparent from the accompanying drawings, the following description and the appended claims.

DETAILED DESCRIPTION

The heat exchanger of the present invention is designed to be used with a gas turbofan engine of otherwise conventional design. Typically, such engines are mounted in a similarly shaped nacelle and include a fan at the engine inlet which provides core and bypass air flows. The core air is supplied to a compressor which discharges the core air at high pressure. The high pressure air is mixed with fuel in combustion chambers and ignited. The resulting combustion gases power successive high pressure and low pressure turbines to drive the fan and compressor and provide a net thrust.

The bypass air from the fan passes through an annular bypass duct around the core of the engine, which comprises the compressor, combustor and high pressure turbine. The bypass air is cooler than the core air discharged from the compressor and is therefore effective as a cooling medium. A typical engine as generally described above is shown in Hurley et al. U.S. Pat. No. 4,271,666, the disclosure of which is incorporated herein by reference.

Figure 1:
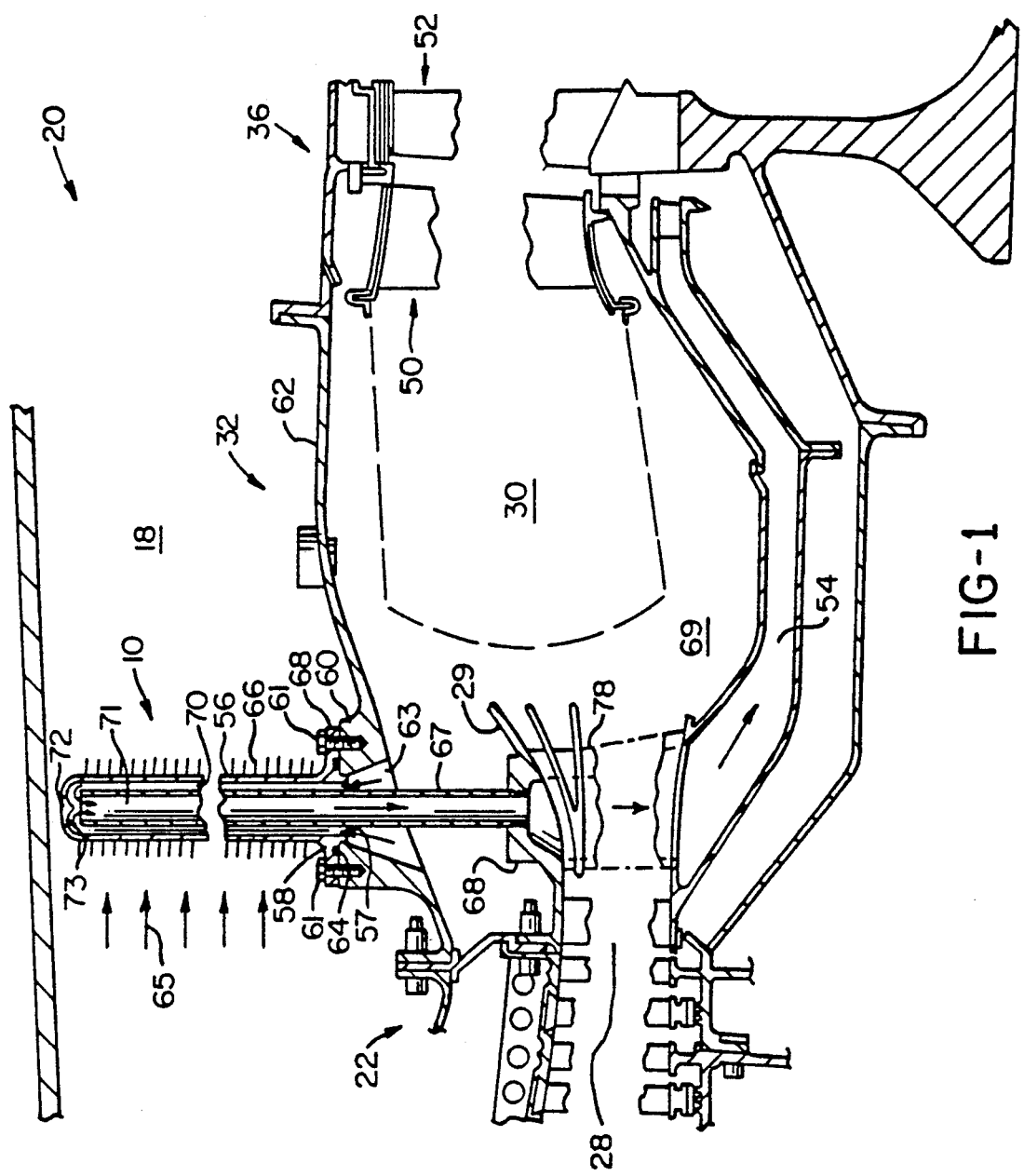
FIG. 1 is a somewhat schematic side elevation, in section, of a segment of a turbofan engine showing the heat exchanger of the present invention.

As shown in FIG. 1, the present invention is a heat exchanger, generally designated 10, used to cool components of a gas turbine engine, generally designated 20, having a compressor 22 which forces air under high pressure out a discharge 28, through a diffuser 29 and into a combustor 32. The air is mixed with fuel and ignited in combustion chamber 30, and the combustion gases pass through high pressure turbine 36 comprised of turbine nozzles or vanes 50 and turbine blades 52. The heat exchanger 10 is in fluid communication with the high pressure compressed air discharged from the compressor 22 and functions to provide cooling air which is in fluid communication with the turbine 36 or other engine components to be cooled via a cooling manifold 54.

Figure 2:
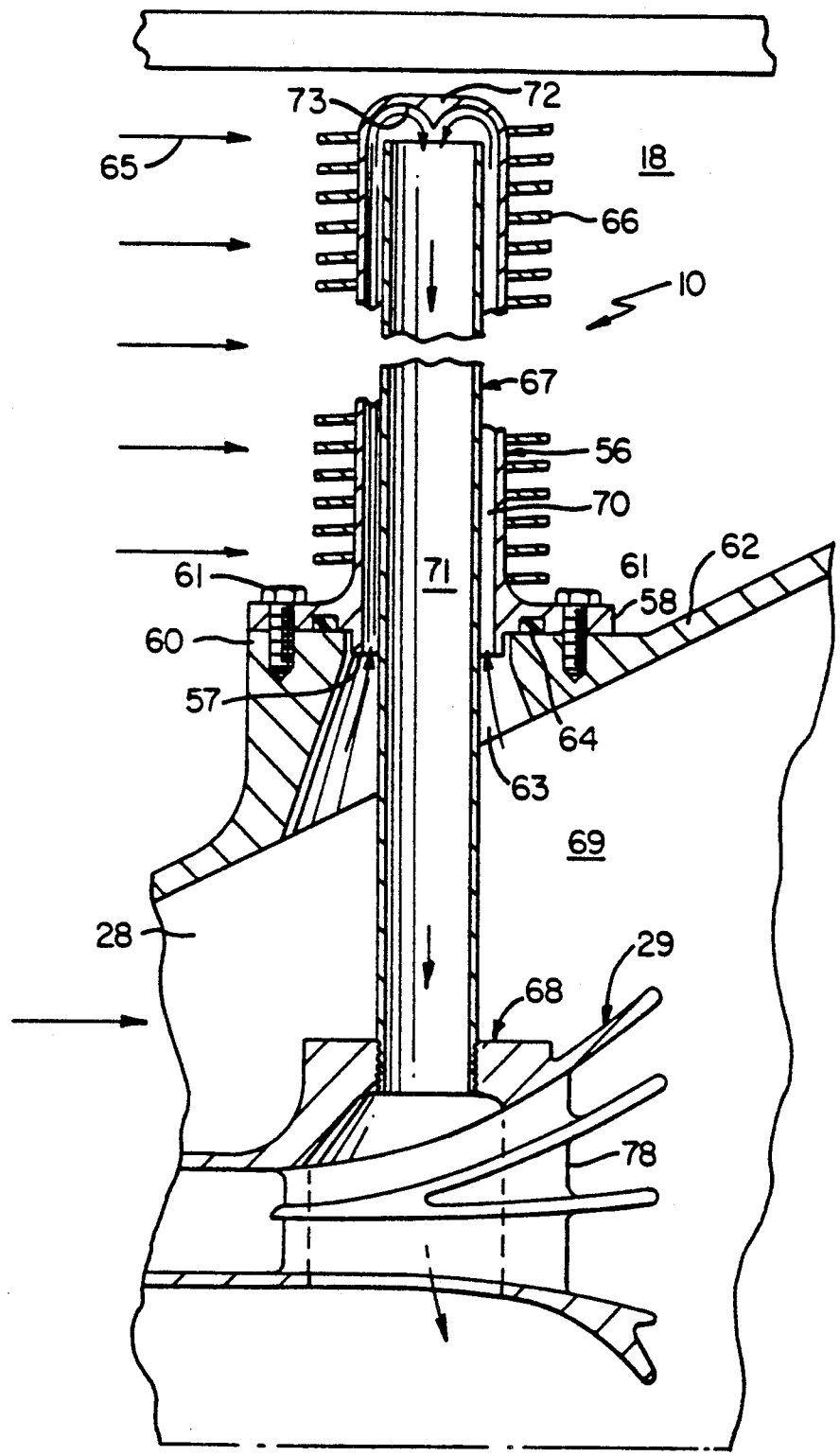
FIG. 2 is an enlarged detail, in section, of the heat exchanger of FIG. 1.

As shown in FIGS. 1 and 2, the heat exchanger 10 is of a standpipe design having a cylindrical outer first member 56 made of a heat conductive material and having radially inner open end 57 rigidly connected at a flared base 58 to a boss 60 by bolts 61. The boss 60 is integral with the combustor casing 62 and includes a frusto-conical inlet 63 opening into the combustor plenum 69 and communicating with open end 57. A seal is made with high temperature gasket 64 between boss 60 and base 58. The outer member 56 is preferably made from a high temperature, low density, high thermal conductive material such as a titanium aluminide. The outer member 56 has a length extending substantially radially with respect to the engine into the contained volume of the bypass air duct 18 surrounding the compressor 22, combustor casing 62 and turbine 36. The external surface of the outer member 56 is in contact with the bypass air 65 and preferably includes disk-shaped cooling fins 66 for increasing the area of contact with the bypass air and the rate of heat transfer thereto.

The heat exchanger 10 includes a cylindrical inner second member 67 having open ends with one end being threaded into a boss 68 which is integral with diffuser 29. The inner member 67 has a length positioned substantially radially relative to the engine 20 and extends coaxially within the outer member 56. Compressed core air at the compressor discharge 28 enters the combustor plenum 69 under high pressure, and secondary air to be used for secondary turbine cooling is received through the heat exchanger inlet 63. The secondary air passes through an outer annular air flow passage 70 formed between the inner and outer members 67, 56. While the secondary air is moving through the outer air passage 70, heat is transferred from the secondary air through the outer member 56 to the cooler bypass air 65.

At the end of the outer member 56, the cooled secondary air reverses direction and flows through an interior air flow passage 71 of the inner member 67. The outer member 56 has a closed end 72 with an internal contoured surface 73 which guides the air to flow radially inwardly, relative to the standpipe 10, to the interior passage 71. A thermal barrier coating may be applied to the inner member 67 so that heat is not transferred back to the cooled secondary air as it passes through the inner member. However, the inner member 67 is preferably made entirely from a low weight, low thermal conductive material such as a ceramic matrix composite. At the bottom of the inner member 67, the secondary air passes through the boss 68 and hollow strut 78 into the cooling manifold 54. The manifold 54 provides secondary cooling air passages to components of the turbine 36.

The heat exchanger 10 comprised of the elongate tubular members shown in FIGS. 1 and 2 has several advantages. For example, the air passing to the heat exchanger inlet 63 has been immediately discharged from the compressor and therefore is the coolest air within the combustor 32. In addition, the heat exchanger 10 requires that the air change direction only one time; consequently, both the resistance to air flow through the heat exchanger and the pressure drop across the heat exchanger are minimal. The inner and outer members 67, 56 are not mechanically connected to each other, and therefore each member may have its own independent differential thermal growth, either axially or radially, between the hotter inlet side and the cooler discharge side without a flexible interconnecting coupling. Consequently, each of the members 67, 56 may be rigidly connected to the engine and only static seals are required, thereby minimizing leakage potential and weight.

Although the presence of the heat exchanger 10 in the bypass air duct will to some degree disrupt the flow of bypass air therethrough, the effects of such disruption may be minimized by utilizing a number of radially-extending heat exchangers, preferably equally spaced, around the circumference of the engine. By utilizing a plurality of heat exchangers 10, the distance the cooled air must travel is minimized by the parallel nature of the air paths 70, 71 within each heat exchanger. The utilization of many heat exchangers having parallel short paths is preferred over the use of fewer heat exchangers having long serpentine paths because the total pressure drop across the heat exchangers is less, resulting in greater air supply pressure to the components to be cooled. Finally, the impact of a single failed pipe is reduced because less air flow would be made available for dumping air into the bypass stream.

In summary, the heat exchanger cools air by directing a flow of high pressure air discharged from the compressor in a first radially-extending, annular path away from the engine, transferring heat from that air flow to the bypass air, and changing the direction of the air flow into a second radially-extending path inside and concentric with the first path back toward the engine.

It should be noted that the flow areas and pipe lengths of the heat exchanger 10 may be varied to achieve an intended temperature drop. The outer member 56 may be manufactured with or without cooling fins or may contain cooling fins of different designs. Other devices may also be employed to increase the effectiveness of the heat transfer. For example, the passage 70 may include elements for directing the flow of secondary air, thereby increasing the time the secondary air is in contact with a heat transfer surface as well as increasing the heat transfer surface area. Also, dampers may be installed between pipes to inhibit resonance.

To minimize the disruption to the flow of bypass air, the cross-sectional shape of the inner and outer members may be varied. For example, in addition to the round shape depicted in the figures, the members may be elliptical, have the shape of an airfoil or any combination thereof. Further, the secondary air from the heat exchanger 10 may be ducted to various engine components utilizing hollow struts, pipes or a combination thereof. In addition, the heat exchanger 10 of the design described may be mounted at other locations on the combustor casing 62; for example, adjacent the turbine vane 50 to provide vane cooling.

While the invention has been illustrated in some detail according to the preferred embodiments shown in the accompanying drawings, and while the preferred embodiments have been described in some detail, there is no intention to thus limit the invention to such detail. On the contrary, it is intended to cover all modifications, alterations and equivalents following within the spirit and scope of the appended claims.

What is claimed is:

1. A method for cooling air in a substantially cylindrical gas turbine engine having a compressor producing high pressure air, a turbine and a bypass duct existing between a core casing and an outer casing for ducting high pressure bypass air surrounding the compressor and turbine, the method comprising the steps of:
   independently statically and sealingly mounting first radial and unshrouded heat exchanger tube constructed of a first heat conductive material to the combustor casing and second radial heat exchanger tube constructed of a second heat insulative material composition dissimilar from said first material to a diffuser to thermally decouple said combustor and diffuser radially extending directly into said high pressure bypass air duct, proximate said outer casing and in coaxial relation to said engine immediately adjacent to said compressor, for directing a flow of the high pressure and high velocity compressor air along a first substantially radial air flow path away from the engine wherein said first and second tubes rigidly affixed to said combustor casing and forming a single unified outer air passage therebetween;
   transferring heat from the flow of high pressure and high velocity compressor air in the first substantially radial air flow path to the high pressure bypass air;
   directing the flow of high pressure and high velocity compressor air from the first substantially radial air flow path to a second substantially radial air flow path inside the first substantially radial air flow path; and
   directing the flow of high pressure and high velocity compressor cooled air in second substantially radial air flow path toward the engine immediately adjacent to said compressor and discharging said air to cool engine components proximate said discharge.

2. In a gas turbine engine having axially coupled fan, compressor, combustor and turbine sections, said far for supplying high pressure bypass air and said compressor for supplying elevated temperature air to said combustor, a bypass duct existing between a core casing and an outer casing for ducting said high pressure bypass air, a radially extending heat exchanger comprising:
   a first radial tubular and unshrouded member extending directly into said bypass duct proximate said outer casing, said first member constructed of a first heat conductive material and statically and sealingly mounted on a first combustor portion of said engine immediately adjacent to said compressor and having an open end positioned to receive air from said compressor, said air being at a temperature elevated with respect to said bypass air, said first member being shaped and rigidly affixed to combustor casing to extend from said engine to contact said bypass air flowing therearound;
   a second member constructed of a second material dissimilar from said first material, and extending within said first member and said second member being statically and sealingly mounted to diffuser to thermally decouple the combustor and diffuser independently of said first member and said first and second members forming a single unified outer air passage therebetween;
   whereby high velocity and high pressure air flows from said open end along said outer air passage in heat exchange relationship with said bypass air, said second member having an inner air passage therethrough for receiving cooled air from said outer air passage; and
   means for receiving cooled air from said inner passage and conveying said cooled air within said engine to cool components of said engine located proximate said means for receiving said cooled air.

3. The heat exchanger of claim 1 wherein said second member is coaxial with said first member, whereby said inner air passage is concentric with said outer air passage.

4. The heat exchanger of claim 1 wherein said second inner member has a thermal barrier coating sufficient to minimize heat transfer to cooled air within said inner member.

5. The heat exchanger of claim 4 wherein said inner member is made of ceramic matrix composite material and said outer member is made of titanium aluminide material.

6. The heat exchanger of claim 1 wherein said first outer member is made of a high thermally conductive material and said inner member is made of a low thermally conductive material.

7. The heat exchanger of claim 2 wherein said first and second members are elongate and extend substantially radially with reference to the engine.

8. The heat exchanger of claim 2 wherein said heat exchanger further includes means for increasing heat transfer with the bypass air per unit length of said heat exchanger.

9. A heat exchanger for providing cooling air to components in a substantially cylindrical gas turbine engine having a compressor for providing high velocity compressed air, said engine having high pressure bypass air flowing through a contained volume surrounding the compressor, the high velocity compressed air having a higher temperature than the high pressure bypass air, said heat exchanger comprising:

a first radial and unshrouded, hollow, tubular member comprised of a first heat conductive material and having an open end, said first member being independently, statically and sealingly, fixedly mounted to a first combustor portion of the engine immediately adjacent to said compressor and having a length extending substantially radially away from the engine whereby the first member has direct contact with the high pressure bypass air; and a second radial, hollow, tubular member comprised of a thermally nonconductive material and having two open ends, said second member being statically and sealingly affixed rigidly to a diffuser of said engine independently of said first member to thermally decouple said combustor and diffuser and having a length extending substantially radially away from the engine within the first member thereby forming a single unified outer air flow passage between the first and second members and continuing through the second member, said air flow passage having an inlet in fluid communication with the high velocity compressed air and an outlet in fluid communication with the components to cool components of said engine located proximate said outlet.

10. The heat exchanger of claim 9 wherein said second hollow member is affixed to the engine in a coaxial relationship to the first hollow member.

11. An apparatus for cooling engine components of a turbofan engine having an inlet connected to a compressor discharge of said engine for drawing high velocity compressor air therefrom, a heat exchange member positioned in a high pressure bypass duct of said engine immediately adjacent to said compressor for effecting heat transfer from said compressor air to bypass air, and an outlet connected to convey cooled air to said engine components, wherein the improvement comprises said heat exchanger member having:

an outer radial and unshrouded tubular member, of a first heat conductive material, independently statically and sealingly attached to a first combustor portion of said engine immediately adjacent to said compressor and directly extending substantially radially outwardly into said high pressure bypass duct and having an open bottom to receive high pressure and high velocity air from said compressor; and an inner radial tubular member, of a second heat insulative material composition thermodynamically different from said first material, independently statically and sealingly mounted to a diffuser of said engine wherein said first and second thermally decoupled members are rigidly affixed and radially extending from said engine to directly contact the high pressure bypass air flowing therearound and extending within said outer tubular member to create a single unified outer air flow path therewith to convey said high velocity compressor air radially outwardly, said inner tubular member being open-ended and connected to said engine to convey said cooled air radially inwardly to cool said engine components.

* * * * *